April 4, 1939. J. L HARDY 2,153,466
FLEXIBLE TRANSMISSION COUPLING
Filed Oct. 10, 1938
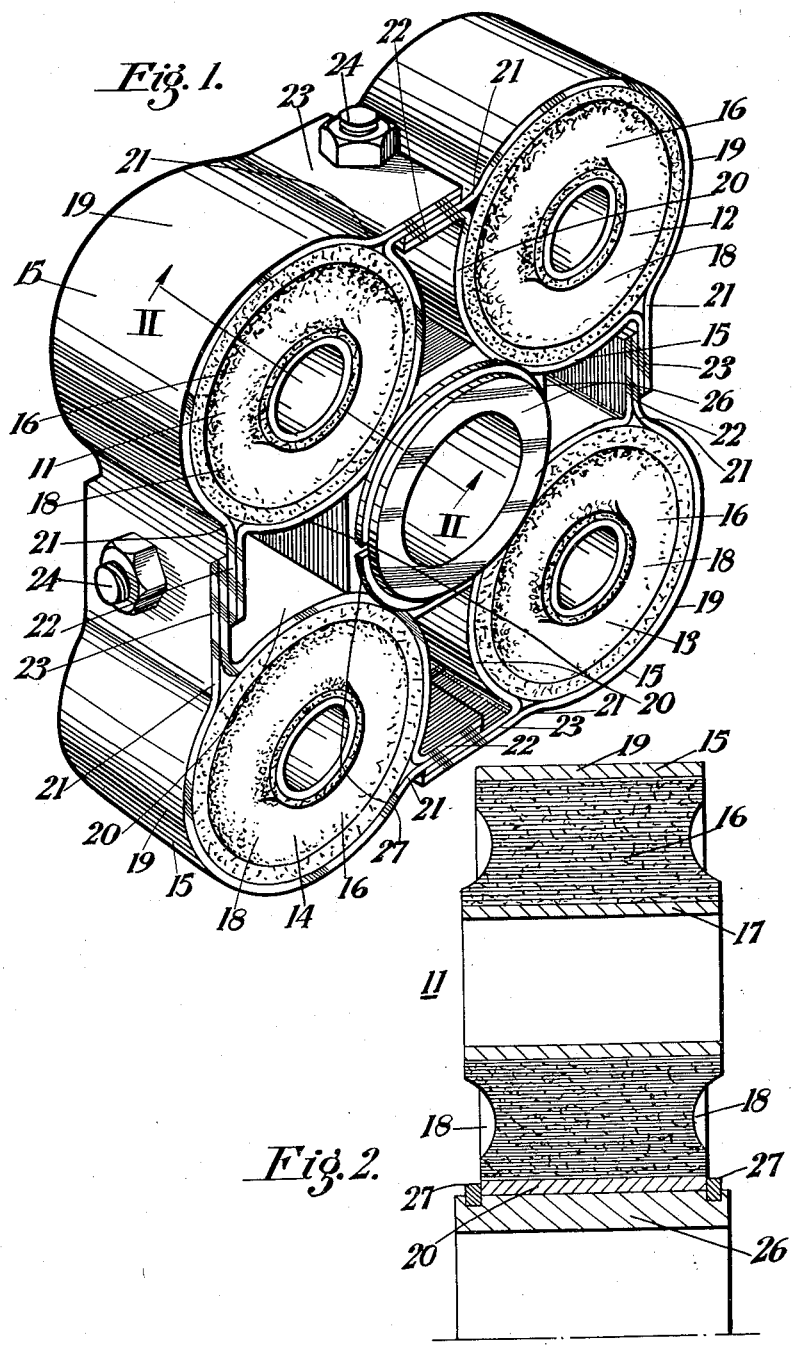
Inventor
John Leslie Hardy
by Mawhinney & Mawhinney
Attorneys.

Patented Apr. 4, 1939

2,153,466

UNITED STATES PATENT OFFICE 2,153,466

FLEXIBLE TRANSMISSION COUPLING

John Leslie Hardy, Birmingham, England, assignor to Hardy, Spicer & Co. Limited, Birmingham, England Application October 10, 1938, Serial No. 234,316
In Great Britain May 12, 1938

6 Claims. (Cl. 64—11)

This invention relates to flexible transmission couplings, and particularly to such as are to be used in the drives of motor-vehicles, of the kind which make use of a coupling member in which are secured an even number of flexible bushes the bores of which are alternately engaged with and secured to driving and driven pins arranged to be substantially parallel to and angularly spaced from one another about the main axis of the coupling member.

My main object is to provide an improved coupling member of this character; and, in particular, one with which there will be a saving in weight and a saving in manufacturing costs compared with present-day standards, and, moreover, with which repairs, when they should be necessary, can be more easily carried out than at present.

According to the invention the coupling member includes an even number of units each of which includes a flexible bush secured to a driving or driven pin engaged with its bore and secured to a housing therefor, the housings being bolted or otherwise detachably secured to one another with the pins arranged as aforesaid.

The bushes are preferably of rubber or rubberized material, having in their end faces grooves coaxial with their bores in a manner known per se, and are secured to the associated pins (which are conveniently in the form of metal tubes) and the housings by vulcanization. Preferably each housing is formed of two or more part-tubular pressings united to one another and formed with lugs on opposite sides for attachment to corresponding lugs of adjacent housings.

In such a coupling use may be made of a centrally-disposed spacing and reinforcing member detachably held in position.

In the accompanying drawing:

Figure 1 is a perspective view of one form of coupling member according to the invention; and Figure 2 is a fragmentary cross-sectional view taken on the line II—II of Figure 1.

In the construction illustrated there are four units 11, 12, 13 and 14 each of which comprises a housing 15 bonded to the outer periphery of a rubber bush 16 and a tubular pin 17 bonded to the bore of the rubber bush. The latter has grooves 18, 18 on its end faces coaxial with the tubular pin. Each housing in this example is shown as being built up of two part-tubular members 19, 20 formed of steel strip with flanges on opposite sides. Each adjacent pair of flanges is welded together as shown at 21 to form lugs 22, 23 on opposite sides of each housing. The lugs 23 on one side are placed over the adjacent lugs 22 on the other side of the adjacent housings and detachably secured thereto. The drawing shows for this purpose bolting means 24.

In practice the tubular pins of the units 11 and 13 will be respectively engaged by a pair of bolts carried by, say, a driving flange or yoke, and the tubular pins of the units 12 and 14 by a pair of pins carried by a driven flange or yoke.

If any of the bushes should wear, or if any other part of a unit should fracture, the faulty unit can be at once removed by undoing the associated driving or driven bolt and the bolting means 24 by which the unit is attached to the adjacent units and replaced by another unit. All the units are, in fact, identical and replaceable.

In the present instance we show a centrally-disposed spacing and reinforcing member 26 the outer periphery of which is shaped to contact with the adjacent portions of the housings of the four units. This member 26 is detachably held in position, being endwise located against the ends of the housings by means of circlips 27, 27 at its ends. If desired, its ends can be radially flanged, instead of circlips being used, for endwise location, the units being assembled on to it in a manner that will be well understood.

The parts of this flexible coupling can be inexpensively manufactured, the individual housings being formed of steel strip bent to shape, and the tools for blanking and forming the steel strips are simple ones. When the part-tubular steel strips have been welded to one another to form a complete housing, this will serve as part of the mould for the rubber bush during the vulcanizing process. When each unit has been built up the whole coupling member can be rapidly assembled, and, as previously pointed out, any unit becoming faulty can easily be detached and replaced without the rest of the coupling member having to be taken apart. The overall weight of the coupling, moreover, is less than that of similar couplings as used at the present time.

What I claim as my invention and desire to secure by Letters Patent of the United States is:

1. In a flexible transmission coupling between driving and driven pins, a coupling member including an even number of units, each unit including a flexible bush in the bore of which is secured one of the pins, and which is also secured to a housing therefor formed in said unit, said units being detachably secured to one another with said pins substantially parallel to and angularly spaced from one another about the main axis of the coupling and with the driving pins alternating with the driven pins.

2. In a flexible transmission coupling between driving and driven members rigidly carrying pins, a coupling member including an even number of units, each unit including a flexible bush in the bore of which is secured one of the pins and a housing in which said bush is secured, said housings being detachably secured to one another with said pins substantially parallel to and angularly spaced from one another about the main axis of the coupling and with the driving pins alternating with the driven pins, and each of said housings being formed of at least two part-tubular pressings united to one another.

3. In a flexible transmission coupling between driving and driven pins, a coupling member comprising an even number of units each including a flexible bush in the bore of which is secured one of the pins, a housing in which the bush is secured, said housings being detachably secured to one another with said pins substantially parallel to and angularly spaced from one another about the main axis of the coupling and with the driving pins alternating with the driven pins, and a centrally-disposed spacing and reinforcing member detachably held in position against the housings.

4. In a flexible transmission coupling between driving and driven pins, a coupling member including an even number of units, each unit including a flexible bush secured to one of the pins and a housing in which said bush is secured, each of said housings having lugs on opposite sides for attachment to corresponding lugs of adjacent housings, whereby said housings can be detachably secured to one another with said pins substantially parallel to and angularly spaced from one another about the main axis of the coupling and with the driving pins alternating with the driven pins.

5. In a flexible transmission coupling between driving and driven pins, a coupling member including an even number of units, each unit including a flexible bush secured around one of said pins, and a housing in which said bush is secured, each of said housings being formed of at least two part-tubular pressings united to one another and having lugs on opposite sides for attachment to corresponding lugs of adjacent housings, whereby said housings can be detachably secured to one another with said pins substantially parallel to and angularly spaced from one another about the main axis of the coupling and with the driving pins alternating with the driven pins.

6. In a flexible transmission coupling between driving and driven pins, a plurality of cylindrical housings each formed of at least two part-tubular pressings welded to one another and having lugs on opposite sides for bolting to corresponding lugs of adjacent housings, whereby said housings may be detachably secured to one another with their bores substantially parallel to and angularly spaced from one another about the main axis of the coupling, and rubber bushes secured in said housings by vulcanization, each of said bushes having one of said pins secured in its bore by vulcanization, the driving pins alternating with the driven.

JOHN L. HARDY.